United States Patent
Jiao

(10) Patent No.: US 6,988,434 B1
(45) Date of Patent: Jan. 24, 2006

(54) MULTI-AXIS TOOL POSITIONER AND RELATED METHODS

(75) Inventor: Guijin Jiao, Garland, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 0 days.

(21) Appl. No.: 10/726,973

(22) Filed: Dec. 3, 2003

(51) Int. Cl.
B24B 49/00 (2006.01)
B26D 1/00 (2006.01)
B26F 3/00 (2006.01)

(52) U.S. Cl. .............................. 83/13; 83/177; 451/11
(58) Field of Classification Search ................... 83/177
See application file for complete search history.

(56) References Cited

U.S. PATENT DOCUMENTS

| | | | |
|---|---|---|---|
| 2,718,820 A | 9/1955 | Faselt | |
| 3,359,861 A | 12/1967 | Johnson et al. | |
| 3,384,970 A | 5/1968 | Avalear | |
| 3,517,578 A | 6/1970 | Krofta | |
| 3,526,162 A | 9/1970 | Wilcox | |
| 3,532,014 A | 10/1970 | Franz | |
| 3,806,691 A | 4/1974 | Roach | |
| 3,923,086 A * | 12/1975 | Spohn, Jr. | 409/216 |
| 3,996,825 A | 12/1976 | Terry | |
| 4,155,173 A | 5/1979 | Sprandel | |
| 4,182,170 A | 1/1980 | Grupp | |
| 4,228,595 A | 10/1980 | Steinbach | |
| 4,246,838 A * | 1/1981 | Pulver et al. | 83/177 |
| 4,662,117 A | 5/1987 | Korwin et al. | |
| 4,756,089 A | 7/1988 | Danielsson, III | |
| 4,855,565 A | 8/1989 | Thomas et al. | |
| RE33,917 E * | 5/1992 | Lapeyre et al. | 83/177 |
| 5,146,808 A | 9/1992 | Hoshino | |
| 5,189,805 A | 3/1993 | Matsumoto et al. | |
| 5,219,379 A | 6/1993 | Good et al. | |
| 5,339,715 A * | 8/1994 | Coleman | 83/177 |
| 5,346,343 A * | 9/1994 | Babel | 409/201 |
| 5,535,496 A * | 7/1996 | Sugino et al. | 451/67 |
| 5,571,381 A | 11/1996 | Vessari et al. | |

(Continued)

FOREIGN PATENT DOCUMENTS

EP 1238764 A2 11/2002

(Continued)

OTHER PUBLICATIONS

McMaster-Carr Supply Company, Catalog 105, pp. 2100-2109.

Primary Examiner—Allan N. Shoap
Assistant Examiner—Jason Prone
(74) Attorney, Agent, or Firm—Baker & McKenzie LLP

(57) ABSTRACT

Disclosed herein are positioning devices and related methods of positioning a tool in a desired location. In one exemplary embodiment, a positioning device includes a base having a length extending along a first horizontal axis. In addition, the positioning device includes a first arm coupled to the base and extending therefrom along a second horizontal axis perpendicular to the first horizontal axis. The first arm is configured for linear movement across the base along the first horizontal axis. The positioning device also includes a second arm coupled to the first arm carriage and extending therefrom along a vertical axis, where the second arm is configured for linear movement along the second horizontal axis. Moreover, in this embodiment, the second arm is also configured to pivot about a first rotational axis parallel to the first horizontal axis. Also in this embodiment, the positioning device includes an extending arm coupled to the second arm and parallel therewith, and configured for linear movement along the vertical axis and for rotational movement about a second rotational axis parallel to the vertical axis.

26 Claims, 2 Drawing Sheets

U.S. PATENT DOCUMENTS

| | | | |
|---|---|---|---|
| 5,604,677 A | 2/1997 | Brien | |
| 5,605,492 A * | 2/1997 | Klingel | 451/40 |
| 5,621,978 A | 4/1997 | Sarauer | |
| 5,636,558 A | 6/1997 | Sanders et al. | |
| 5,664,308 A * | 9/1997 | Deitert | 409/201 |
| 5,704,824 A * | 1/1998 | Hashish et al. | 451/36 |
| 5,718,545 A * | 2/1998 | Husted | 409/201 |
| 5,765,448 A | 6/1998 | Martelli | |
| 5,778,713 A * | 7/1998 | Butler et al. | 451/39 |
| 5,879,515 A | 3/1999 | Staub et al. | |
| 6,001,219 A | 12/1999 | Caspar | |
| 6,077,148 A * | 6/2000 | Klein et al. | 451/11 |
| 6,135,000 A | 10/2000 | Caspar et al. | |
| 6,210,534 B1 | 4/2001 | Graf | |
| 6,301,989 B1 * | 10/2001 | Brown et al. | 74/490.08 |
| 6,327,948 B1 | 12/2001 | Tuori | |
| 6,357,094 B1 * | 3/2002 | Sugimoto | 409/216 |
| 6,478,658 B1 * | 11/2002 | Logan | 451/11 |
| 6,546,643 B2 | 4/2003 | Lotze et al. | |
| 6,719,506 B2 * | 4/2004 | Chang et al. | 409/201 |
| 6,764,385 B2 * | 7/2004 | Boumerzoug et al. | 451/39 |
| 6,910,946 B2 * | 6/2005 | Yoon | 451/11 |
| 6,932,547 B2 * | 8/2005 | Hardesty et al. | 409/201 |
| 2002/0193217 A1 | 12/2002 | Yoshinaga | |
| 2004/0020339 A1 * | 2/2004 | Gambini | 83/177 |

FOREIGN PATENT DOCUMENTS

| | | |
|---|---|---|
| EP | 1238766 A2 | 11/2002 |
| GB | 1376130 | 2/1971 |

\* cited by examiner

MULTI-AXIS TOOL POSITIONER AND RELATED METHODS

TECHNICAL FIELD

Disclosed embodiments herein relate generally to axial tool positioners, and more particularly to a multi-axis tool positioner and related methods of positioning tools, such as waterjet nozzles for cutting materials.

BACKGROUND

Manufacturing assemblies typically employ tools to carry out various functions or operations. In many situations it would be ideal for such tools to be operable over a wide range of movements, and to be positioned and repositioned depending on various factors, including measurements. One example of an assembly that would stand to benefit from the ability to reposition various tooling elements is the use of an assembly in the manufacturing processes for textile structures, such as nonwoven products.

Nonwoven products have gained continued acceptance in the industry for a wide range of applications, particularly as replacements for woven fabrics. Nonwoven materials typically comprise a single layer of randomly oriented fibers. Examples of products employing nonwoven materials to date include facings or top-sheets in diapers, incontinent pads, bed pads, sanitary napkins, hospital gowns, cleaning towels, carpets, draperies and industrial and commercial goods, such as wipe cloths, tire cords, conveyor belts, and hospital fabrics. It is typically desirable to produce the nonwoven material so that it has the flexibility and hand softness of a textile, yet is as strong as possible.

Conventional manufacturing processes for nonwoven materials, such as nonwoven glass fiber materials employed in roofing shingles, as well as other products, typically follow a similar approach. Specifically, a slurry of glass fibers is made by adding glass fiber strands to a pulper to disperse the fiber in the white water. The slurry mixture is then deposited onto a "forming wire" and dewatered to form a continuous wet nonwoven fibrous mat. A binding agent may then be applied to the wet mat to bond the randomly dispersed fibers in their respective locations and directions.

Such manufacturing processes normally do not, however, form a nonwoven material to a desired width. And since the nonwoven manufacturing assemblies are designed to accommodate a wide range of products with different widths, the material must typically be cut to a desired size. Specifically, before it is dried and rolled for packaging, the nonwoven material is typically subject to two cutting stages, a wet-cut and a dry-cut. Since the binder agent is solidified after drying and curing, the peripheral trims of the material after drying are normally not recycled or reusable. But, the material trimmed during the wet-cutting stage is typically recycled, reducing overall manufacturing costs. Thus, it is advantageous to make cuts of excess material during the wet-cutting process as close as possible to the final dimension of the nonwoven material.

Moreover, waterjet nozzle orientation contributes to unsatisfactory trimming, thus resulting in increased waste. For example, the angle at which the waterjet nozzle sprays the material to be trimmed impacts the success of material separation. Unfortunately, conventional devices do not typically have a broad range of nozzle movement and orientation in desirable directions. Moreover, conventional positioning devices do not typically provide for quick return to previous orientation positions for the nozzle, increasing the set-up time for wet-cutting the nonwoven material. Consequently, when employing such devices, a trial-and-error approach is usually required each time a wet-cut of a material is accomplished during manufacturing. Of course, trial-and-error approaches typically result in more wasted material as the operator attempts to find the best orientation for wet-cutting. Furthermore, conventional positioning devices are typically operated by manually moving the nozzle into position. Since the waterjet nozzle is located near the moving nonwoven material, the danger to the operator increases as he adjusts the nozzle. Accordingly, a positioning device is needed that does not suffer from such deficiencies.

BRIEF SUMMARY

Disclosed herein are positioning devices and related methods of positioning a tool in a desired location. In one exemplary embodiment, a positioning device includes a base having a length extending along a first horizontal axis. In addition, the positioning device includes a first arm coupled to the base and extending therefrom along a second horizontal axis perpendicular to the first horizontal axis. The first arm is configured for linear movement across the base along the first horizontal axis. The positioning device also includes a second arm coupled to the first arm carriage and extending therefrom along a vertical axis, where the second arm is configured for linear movement along the second horizontal axis. Moreover, in this embodiment, the second arm is also configured to pivot about a first rotational axis parallel to the first horizontal axis. Also in this embodiment, the positioning device includes an extending arm coupled to the second arm and parallel therewith, and configured for linear movement along the vertical axis and for rotational movement about a second rotational axis parallel to the vertical axis.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION OF PREFERRED EMBODIMENTS

Figure 1:
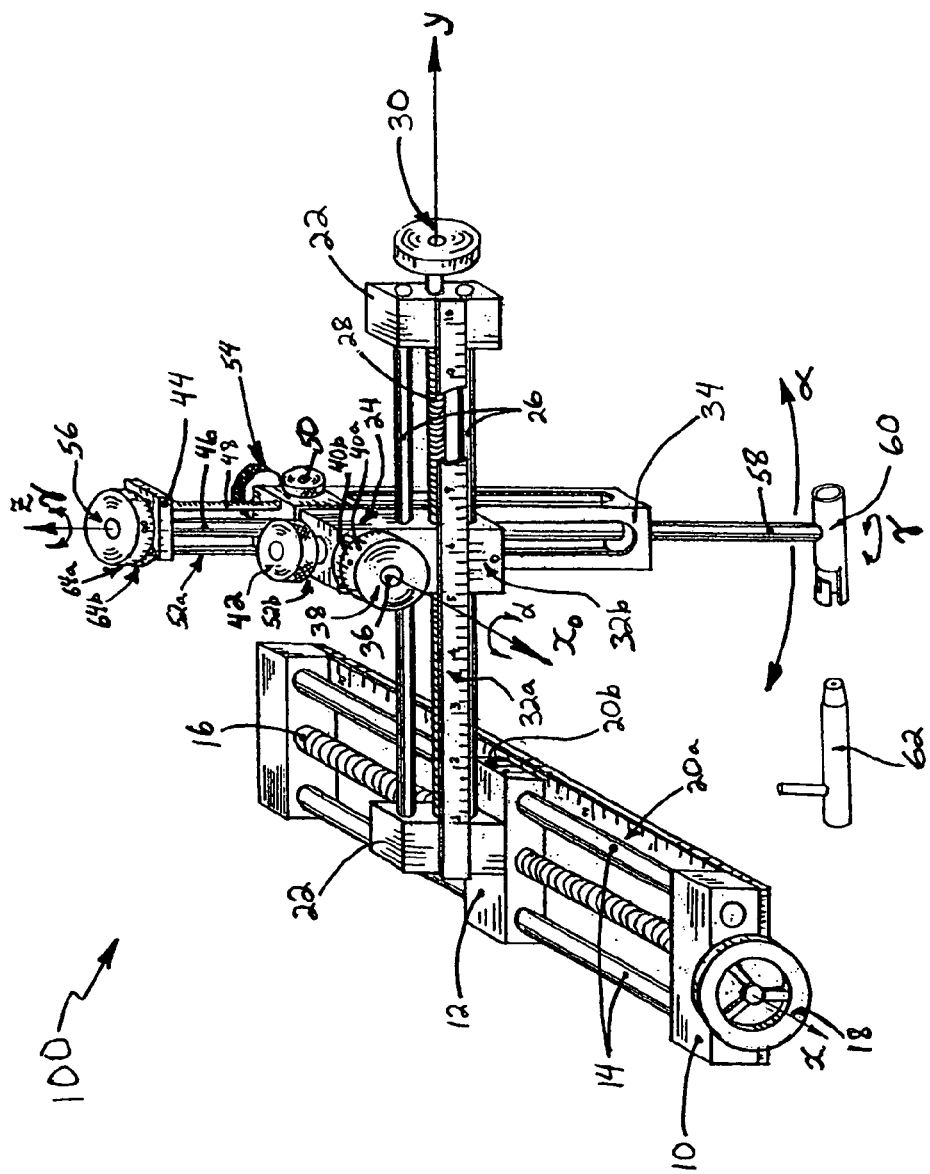
FIG. 1 illustrates an isometric view of an exemplary embodiment of a positioning device.

Referring initially to FIG. 1, illustrated is an isometric view of an exemplary embodiment of a positioning device 100. In various embodiments, the positioning device 100 may be constructed from any appropriate material, depending on the intended application. For example, if intended for use in a potentially corrosive environment, any or all of the various components comprising the positioning device 100 may be constructed from stainless steel. In other embodiments, other types of steels or other metals may be employed as appropriate. In fact, in some embodiments, the positioning device 100 may be constructed from non-metals, such as resin plastics, and the positioning device 100 should not be interpreted to be limited to any particular material.

As shown, the positioning device 100 includes a base 10 having a length extending along a first horizontal axis (e.g., the "x-axis"). A first carriage 12 is moveably coupled to the base 10 and configured to move across the length of the base 10 along the x-axis. In this embodiment, the first carriage 12 is configured to slide across the length of the base 10 on slide rails 14 substantially extending the length of the base 10. To slide the first carriage 12 on the rails 14, a first movement device, which in the illustrated embodiment is a lead screw 16, is also provided. In such an embodiment, the first carriage 12 has an internal threaded portion therein that engages the lead screw 16. Thus, as the lead screw 16 is turned, for example, by use of a handle 18 attached thereto, the first carriage 12 is caused to linearly slide across on the base 10 on the rails 14.

Also included on the base 10 is a first measuring device, which is comprised of two parts 20a, 20b. In an exemplary embodiment the first part 20a is a linear measuring device, such as a ruler or similar device, configured to determine the location of the first carriage 12 with respect to the base 10. The second part 20b of the first measurement device is a linear indicator, for example, a vernier measuring device, positioned on the first carriage 12, to provide the indication of the location of the first carriage 12 along the linear measuring device. Using a vernier or other type of linear indicator is typically dependent upon the accuracy of a desired measurement. More specifically, a vernier device, which is a small but very accurate graduated ruler, can provide more accurate readings on the position than, for example, a simply measuring tape graduated to only $16^{th}$ of an inch. By employing the combination of the first and second portions 20a, 20b, the first measurement device can provide the accurate location of the first carriage 12 along the base 10, as well as provide the ability to place the first carriage 12 in, or return it to, a specific desired location.

In some embodiments, the base 10 may further include a first locking device configured to lock the position of the first carriage 12 along the length of the base 10, once a desired location has been reached. In the illustrated embodiment, the locking device is the lead screw 16 engaged in an internal thread on the first carriage 12 along the base 10. In such an embodiment, the screw 16 may have an ACME thread, a square thread or the like, having less than 35% efficiency with the self-locking function, which tightly engages the first carriage 12 so as to prevent any undesired axial movement. Other threads with an efficiency over 35%, or other locking mechanisms, such as anti-backlash nuts used to lock the lead screw in place, may also be employed to prevent axial movement. Of course, other types of locking devices may also be employed, such as a threaded device mounted to the first carriage 12 that bears down on the rails 14, or other portions of the base 10, to prevent any unwanted movement of the first carriage 12.

Also illustrated in FIG. 1 is a first arm 22 coupled to the first carriage 12 and extending therefrom along a second horizontal axis (e.g., a "y-axis"). As shown, the y-axis may be perpendicular to the x-axis, but other orientations between the two axes are also contemplated. A second carriage 24 is moveably coupled to the first arm 22 and configured to move across the length of the first arm 22 along the y-axis. Like the first carriage 12, in the illustrated embodiment, the second carriage 24 is configured to slide across the length of the first arm 22 on slide rails 26 substantially extending the length of the first arm 22. To slide the second carriage 24 on the rails 26, a second movement device, which in this embodiment is a second lead screw 28, is also provided. Also as before, the second carriage 24 has an internal threaded portion therein that engages the lead screw 28 so that as the lead screw 28 is turned, the second carriage 24 is caused to linearly slide across the first arm 22 on the rails 26. Beneficially, the second movement device may be a handle 30 coupled to an end of the second lead screw 28, and turned to provide the movement of the second carriage 24.

Also included on the first arm 22 is a second measuring device, similar to the first measurement device, and is also comprised of two parts 32a, 32b. In an exemplary embodiment, the first part 32a is a linear measuring device, such as a ruler or similar device, configured to determine the location of the second carriage 24 with respect to the first arm 22. The second part 32b of the second measurement device is also a linear indicator, for example, a vernier device, positioned on the second carriage 24 to provide an indication of the location of the second carriage 24 along the linear measuring device. As discussed above, the particular type of linear indicator employed may depend on the desired accuracy of measurement. As with the first measurement device, by employing the combination of the first and second portions 32a, 32b, the second measurement device can provide an accurate location of the second carriage 24 along the first arm 22, as well as provide the ability to place the second carriage 24 in, or return it to, a specific desired location along the first arm 22.

In advantageous embodiments, the first arm 22 may further include a second locking device configured to lock the position of the second carriage 24 along the length of the first arm 22, once a desired location has been reached. In the illustrated embodiment, the locking device is the second lead screw 28 engaged in an internal thread on the second carriage 24 along the first arm 22. In such an embodiment, the screw 28 may have an ACME thread, a square thread or the like, having less than 35% efficiency with a self-locking function, similar to the first lead screw 16, which tightly engages the second carriage 24 so as to prevent any undesired axial movement. Other threads with an efficiency over 35%, or other locking mechanisms, such as the anti-backlash nut mentioned above, may also be employed to prevent such axial movement. Of course, as before, other types of locking devices may also be employed, such as a threaded device that bears down on the rails 26, as mentioned above, to prevent any unwanted movement of the second carriage 24.

The positioning device 100 further includes a second arm 34 pivotally coupled to the second carriage 24. As shown, the second arm 34 extends from the second carriage 24 along a vertical axis (e.g., a "z-axis"). As used herein, the terms "vertical axis" and "z-axis" include an axis for linear movement in any direction moving towards or away from a horizontal plane defined by the first and second horizontal axes (e.g., the x-axis and y-axis). As such, the z-axis is not merely limited to linear movement in a direction perpendicular to the plane created by the x-axis and y-axis.

The second arm 34 is pivotally coupled to the second carriage 24 via a shaft 36 passing through a portion of the second carriage 24. By being pivotally coupled to the second carriage 24, the second arm 34 is configured to pivot about a first rotational axis (e.g., an "α-axis") that is parallel to the x-axis (i.e., axis $x_o$), and running through the center of the shaft 36. To pivot the second arm 34 with respect to the second carriage 24 (and thus with respect to the first arm 22), a third movement device may be provided. In the illustrated embodiment, the third movement device is a handle 38 fixedly coupled to the shaft 36. Since the second arm 34 is also affixed to the shaft 36, at an opposing end, turning the handle 38 rotates the shaft 36, and results in pivoting the second arm 34 into a desired position or angle. Of course, the handle 38 is not required, and the second arm 34 may be manually moved into a desired position by simply grasping the second arm 34 and relocating it.

Located on the handle 38 and associated with the second arm 34 is a third measurement device, which is also comprised of two parts 40a, 40b. Since the handle 38 in FIG. 1 is rotated to pivot the second arm 34, the first portion 40a of the third measurement device may be a rotational measurement device, such a dial, located on the handle 38. Consequently, the second portion 40b is again a linear indicator, such as a vernier device, but positioned on the second carriage 24 to provide an indication of the radial movement of the handle 38 (and thus the pivot of the second arm 34) with respect to the second carriage 24. Thus, the third measurement device can provide the accurate location of the pivot of the second aim 34 with respect to the second carriage 24, as well as the ability to rotate the second arm 34 to (or back to, as the case may be) a specific desired position.

Also illustrated in FIG. 1, is a third locking device 42 for locking the position of the second arm 34 with respect to the second carriage 24 when pivoting about the shaft 36. In this specific embodiment, the third locking device 42 is a handle having a threaded shaft attached thereto. To operate the third locking device 42, the handle is turned so that the threaded shaft is driven into the second carriage 24 to bear down on the shaft 36 and prevent any unwanted movement of the second carriage 24 once a desired position is located. In a related embodiment, the threaded shaft bears against a separate part (e.g., a pad) that operates similar to a brake shoe. In such an embodiment, this pad then bears against the shaft 36 to stop the pivoting of the second arm 24 in the desired position.

The positioning device 100 still further includes an extending arm 44 having a length extending along the z-axis. The extending arm 44 is coupled to the second arm 34, and the length of the extending arm 44 is parallel with the length of the second arm 34. In the illustrated embodiment, the extending arm 44 moves with respect to the second arm 34 by moving the auxiliary shaft 48 along the z-axis. In this embodiment, the extending arm 44 is sandwiched between collars (not shown), which are fixed on the central shaft 46. The central shaft 46 is coupled to the extending arm 44, is allowed to rotate with respect to the extending arm 44, and is confined in its linear movement with respect to the extending arm 44 by the two collars. As shown, the auxiliary shaft 48 includes a plurality of teeth notched along most of its length. The auxiliary shaft 48 has one end fixed on the extending arm 44 and the other end free for movement along the z-axis. Once the auxiliary shaft 48 moves, the extending arm 44 carries the central shaft 46 along the z-axis, In an advantageous embodiment, these notches may be included on the auxiliary shaft 48 for use with a fourth movement device, which is associated with the second arm 34 and configured to move the extending arm 44 along the z-axis. More specifically, the fourth movement device may be a rack-and-pinion device, as illustrated, having a handle 50 fixed on a pinion gear shaft for turning a pinion gear located within a portion of the second arm 34. In this exemplary embodiment, as the handle 50 is turned, the pinion gear engages the teeth on the rack (i.e. the auxiliary shaft 48,) causing the extending arm 44, along with the central shaft 46, to slide along the second arm 34 along the z-axis. Of course, other types of movement devices may also be employed, such as simply positioning the extending arm 44 manually by grasping it and sliding it along the z-axis with respect to the second arm 34. Or examples may include lead screws similar to those employed above for x-axis and y-axis movement.

Also associated with the extending arm 44 is a fourth measuring device, which like the prior measurement devices is comprised of two parts 52a, 52b. In the illustrated embodiment, the first part 52a (not fully illustrated) is a linear measuring device, such as a ruler or similar device having one end fixed on the extending arm 44, and configured to determine the location of the extending arm 44 with respect to the second arm 34. The second portion 52b (also not fully illustrated) of the fourth measurement device may be another linear indicator, such as a vernier device, affixed on a side of the second arm 34, and provides an indication of the location of the extending arm 44 on the first part 52a of the fourth measurement device as the extending arm 44 slides along the z-axis. As with the prior measurement devices, by employing the combination of the first and second portions 52a, 52b, the fourth measurement device can provide the accurate location of the extending arm 44 as it slides along the second arm 34, as well as provide the ability to place the extending arm 44 in, or return it to, a specific desired location. Furthermore, since the central shaft 46 is moving together with the extending arm 44, the measurement of the extending arm 44 is also the measurement of the location of the central shaft 46.

In addition, in some embodiments, the extending arm 44 may be locked in a specific position along the length of the second arm 34 using a fourth locking device 54, once a desired location has been reached. In an exemplary embodiment, the fourth locking device 54, like the third locking device 42, is a handle having a threaded shaft attached thereto. In such an embodiment, the handle is turned so that the threaded shaft is driven against the central shaft 46 of the extending arm 44 (or is used to drive a pad against the central shaft 46) to prevent any unwanted movement of the extending arm 44 once a desired position is reached. Of course, as before, any appropriate type of locking device may be used as the fourth locking device 54.

The central shaft 46 of the positioning device 100 is configured to rotate about a second rotational axis (e.g., a γ-axis). The γ-axis is through, e.g., parallel to, the z-axis, even as the z-axis is moved by pivoting the second arm 34. As a result, the central shaft 46 is allowed to rotate within the second arm 34 no matter the angle the second arm 34 is positioned with respect to the first arm 22.

To rotate the central shaft 46 about the γ-axis and within the second arm 34, a fifth movement device 56 may be provided. More specifically, the fifth movement device 56 may be associated with the extending arm 44 and configured to rotate the central shaft 46 about the γ-axis. In the illustrated embodiment, the fifth movement device 56 includes a handle fixedly coupled to one end of the central shaft 46. Since the central shaft 46, which is carried by the extending arm 44 (e.g., the part that extends from the second arm 34), is configured to slide within the second arm 34, turning the handle of the fifth movement device 56 also rotates a distal end 58 of the central shaft 46. Of course, other types of movement devices may also be employed.

In the illustrated embodiment, a tool holder 60 is mounted on the distal end 58 of the central shaft 46 for holding any appropriate tool based on the use of the positioning device 100. For example, in the illustrated embodiment, the tool holder 60 may be configured to hold a nozzle 62 configured to spray fluids. In a more specific embodiment, the nozzle 62 may be a nozzle for a waterjet cutting device. Such waterjet devices may be employed to cut the edges of materials, for example, wet-formed nonwoven materials, during the manufacturing process. Of course, the nozzle 62 need not be limited to waterjet cutting devices, and may, in fact, be any type of tool, such as a laser, air knife or other tool that may be positioned during a manufacturing (or other type of) operation.

Located on the handle of the fifth movement device 56, in the illustrated embodiment, is a fifth measurement device associated with the extending arm 44. When employed with the positioning device 100, the fifth measurement device determines the amount of rotation of the central shaft 46 about the γ-axis. As with some of the other measurement devices, the fifth measurement device may be comprised of two portions 64a, 64b. Since in this exemplary embodiment the handle is spun to rotate the central shaft 46, the first portion 64a of the fifth measurement device may be a rotational measurement device, such a dial, located on that handle. Then, the second portion 64b, which is a vernier indicator in the illustrated embodiment is positioned on the extending arm 44 to provide an indication of the rotation of the handle (and thus the rotation of central shaft 46 and tool holder 60).

Once the desired amount of rotation of the central shaft 46 has been reached, the rotation of the central shaft 46 may be locked into position with a locking device. As illustrated, this locking device may advantageously be the same as the fourth locking device 54 discussed above. More specifically, as the fourth locking device 54 is activated to prevent the extending arm 44 from further movement along the z-axis, the fourth locking device 54 may bear only against the central shaft 46. Thus, in such an embodiment, if the central shaft 46 is prevented from further sliding with respect to the second arm 34, it may also be prevented from further rotation with respect to the second arm 34 as well. For example, in some exemplary embodiments the fourth locking device 54 employs a handle threadedly coupled to an internal shaft having a hole formed therethrough and adapted to receive the central shaft 46 (as described above). In such embodiments, as the handle is turned, the internal shaft is drawn towards the handle of the fourth locking device 54 causing the hole in the internal shaft to bear against the central shaft 46 to prevent its further sliding or rotational movement. Of course, as before, any appropriate type of locking device may be used to prevent the rotation of the central shaft 46, and thus the tool holder 60.

Figure 2:
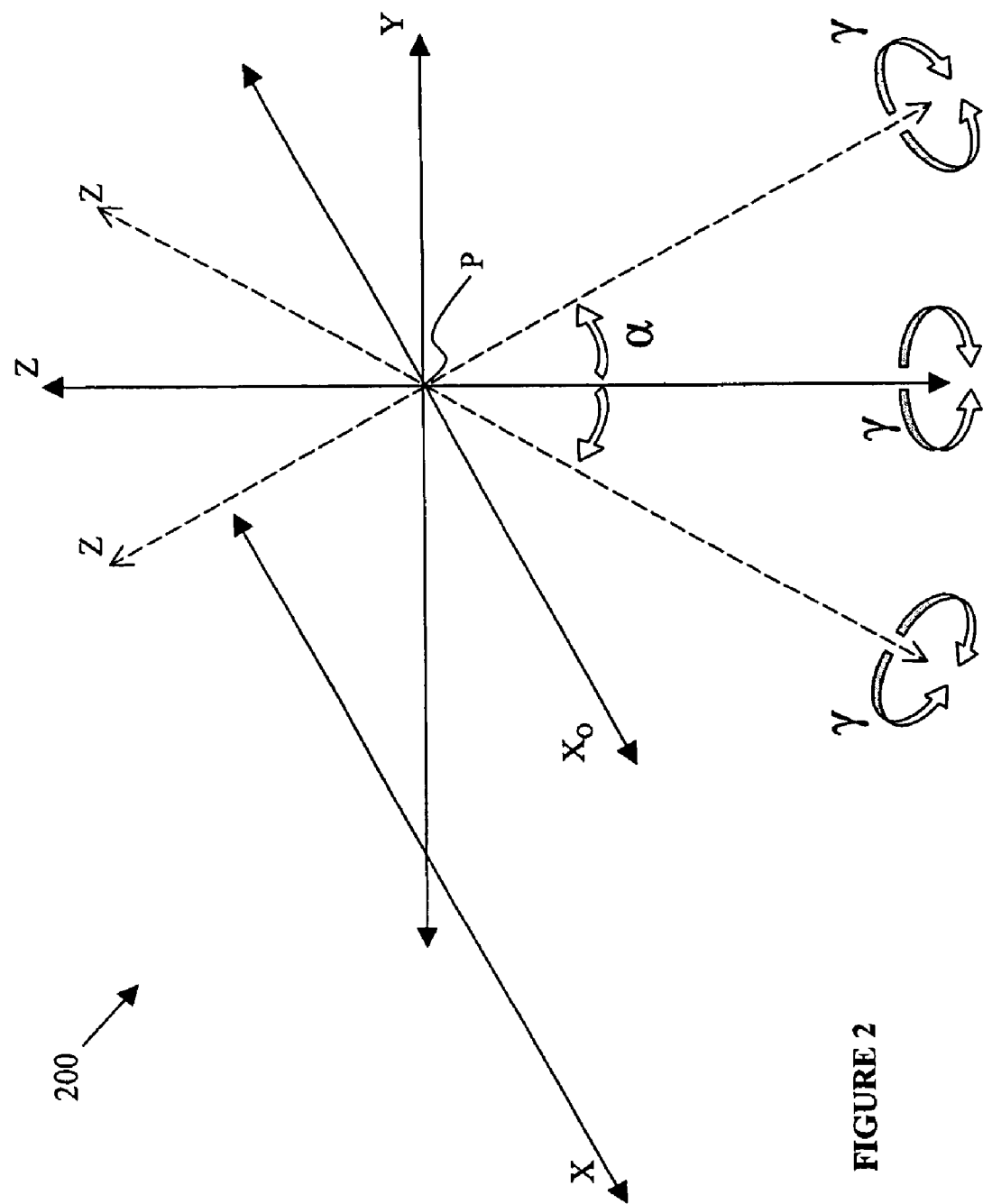
FIG. 2 illustrates an isometric view of an axis diagram showing the multiple axes and corresponding movements for the exemplary positioning of FIG. 1.

Turning now to FIG. 2, illustrated is an isometric view of an axis diagram 200 showing the multiple axes and corresponding movements for the exemplary positioning device of FIG. 1. Specifically, the axis diagram 200 illustrates the first and second horizontal axes, denoted as the x-axis and y-axis, described above. In addition, the axis diagram 200 illustrates the vertical axis (the z-axis) described above with respect to the second arm and extending arm of the positioning device 100. The axis diagram 200 clearly illustrates the relationship between the z-axis and the horizontal axes (x and y). Specifically, the z-axis adds a three-dimensional aspect to the range of movement of a positioning device constructed as disclosed herein. Where the x-axis and y-axis form a plane stretching out in all horizontal directions, the z-axis allows the positioning device to be maneuvered so that the tool mounted thereto may attain elevation above or below that horizontal plane.

Also illustrated by the axis diagram 200 is the swing of the positioning device about the first rotational axis (indicated by "α"). The actual first rotational axis is parallel to the x-axis (through the $x_o$ axis) and passes through a pivot point "P". The axis diagram 200 helps to clearly illustrate the movement of the positioning device about the α-axis through the arrows (marked with α) indicating the possible swing of the second arm of the positioning device. In addition, as indicated by the dashed lines, when the second arm is pivoted about point P, the z-axis is no longer perpendicular to the plane created by the x-axis and y-axis. As a result, the z-axis still provides vertical movement to the tool holder of the positioning device, above or below the plane, without being necessarily perpendicular to the plane.

Finally, the rotation of the extending arm of the positioning device is illustrated as movement about a second rotational axis (indicated by "γ"). As illustrated, even when the second arm is swung about the α-axis, rotation about the γ-axis is still possible for the positioning device. With the addition of this rotational movement for the tool holder, a positioner constructed according to the principles disclosed herein is capable of aiming a tool mounted in the tool holder in virtually any beneficial direction. More specifically, movement along the x-axis and y-axis allows the tool to be positioned proximate a specific location within the broad range of reach of these two horizontal axes. Then, the z-axis provided the ability to adjust a height of the tool holder, depending on the particular operation being performed with the tool. Next, the γ-axis provides the benefit of a full 360° of rotation for the tool, so that it may be aimed in a particular direction.

Finally, the swing provided about the α-axis allows the working end of the tool, for example, a fluid stream produced from a spray nozzle, to have a beneficial amount of angle to it. Thus, such a fluid stream may be given any amount of angle for its flow by swinging the second arm of the positioning device about the α-axis, once a desirable final position for the tool is discovered. By providing this added angle for the working end of the tool, as well as the combination of all the axes or movement provided by the positioning device, certain benefits may be achieved that are not provided by conventional positioning devices. For example, in certain operations, such as the wet-trimming of nonwoven materials during the manufacturing process (remembering that wet-cut nonwoven material may be recycled in the manufacturing process), the swing along the α-axis allows the waterjet nozzle to not only spray from a desirable location, but also to spray from that location at a given angle. Such beneficial movement can assist in the overall manufacturing process since spraying the stream at a particular angle provides not only the cutting action provided by conventional systems, but also the flow angle of the stream to cut waste portions of the nonwoven material in a particular direction. As a result, the waste product from the wet-cutting stage of the manufacturing process can be more accurately directed to a desired location as it is removed from the passing nonwoven material in order to aid in the collection and recycling process for the wet material.

Moreover, the wide range of movements for such a nozzle provided by the positioning device disclosed herein can assist in reducing the amount of waste resulting from the manufacturing process. More specifically, since the direction of the stream can be directed so precisely in the number of directions provided by the device herein, a more precise cut (e.g., closer to the final dimension) may be made along the edge of the nonwoven material as it passes by the cutting station during manufacturing. Furthermore, some conventional devices may cause the stream to leave a jagged finish along the edge of the nonwoven material during the wet-cutting process, as the cut material is pulled away from the remaining material. Such jagged edges could affect how close the cut may be to the final dimension, due to the frays of fibers extending from such jagged cuts. In contrast, the angles provided by the disclosed device (e.g., the swing about the α-axis) allow the direction of the stream to be adjusted with respect to the material edge, in order to attain a better finish (i.e., less or no frayed fibers along the edge) during the cutting operation. When a less jagged edge is produced during wet-cutting, the position of the wet-cut may be located closer to the final width of the nonwoven material, without the risk of frayed or otherwise jagged edges at the finished dimension for the material. Thus, less waste is produced in the overall manufacturing process since less material remains to be removed at the dry-cutting stage of the process.

While various embodiments of a positioning device constructed according to the principles disclosed herein, and related methods of positioning tools, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A positioning device for positioning a tool, the device comprising:
   a base having a length extending along a first horizontal axis;
   a first arm coupled to a first carriage and extending therefrom along a second horizontal axis perpendicular to the first horizontal axis, the first carriage coupled to the base and configured to move across the base along the first horizontal axis;
   a second arm pivotally coupled to a second carriage and extending therefrom along a vertical axis, the second carriage coupled to the first arm and configured to move across the first arm along the second horizontal axis, the second arm configured to pivot about a first rotational axis parallel to the first horizontal axis; and
   an extending arm coupled to the second arm and parallel therewith, the extending arm configured to move across the second arm along the vertical axis and having a central shaft configured to rotate within the second arm about a second rotational axis parallel to the vertical axis.

2. A positioning device according to claim 1, further comprising:
   a first movement device associated with the base and configured to move the first arm along the first horizontal axis;
   a second movement device associated with the first arm and configured to move the second arm along the second horizontal axis;
   a third movement device associated with the second arm and configured to pivot the second arm about the first rotational axis;
   a fourth movement device associated with the second arm and configured to move the extending arm along the vertical axis; and
   a fifth movement device associated with the extending arm and configured to rotate the central shaft of the extending arm about the second rotational axis.

3. A positioning device according to claim 2, wherein one or more of the movement devices comprise handles associated therewith to implement the corresponding movement device.

4. A positioning device according to claim 1, further comprising:
   a first measurement device associated with the base for determining the location of the first arm along the base;
   a second measurement device associated with first arm for determining the location of the second arm along the first arm;
   a third measurement device associated with the second arm for determining the pivot of the second arm about the first rotational axis with respect to the first arm;
   a fourth measurement device associated with second arm for determining the location of the extending arm along the second arm; and
   a fifth measurement device associated with the extending arm for determining the rotation of the central shaft within the extending arm about the second rotational axis with respect to the second arm.

5. A positioning device according to claim 1, further comprising one or more locking devices associated with each of the arms for locking the corresponding locations of each.

6. A positioning device according to claim 1, further comprising a tool holder coupled to an end of the extending arm and configured to hold a tool.

7. A positioning device according to claim 6, wherein the tool holder is configured to hold a nozzle of a waterjet cutting apparatus for directing a waterjet stream emerging from the nozzle.

8. A positioning device according to claim 7, wherein the arms and tool holder of the positioning device are adapted to orient the nozzle for directing the waterjet stream to cut an edge of a nonwoven material.

9. A positioning device for positioning a tool, comprising:
   a base having a length extending along an x-axis;
   a first arm coupled to the base and configured for linear movement along the x-axis;
   a second arm coupled to the first arm and configured for linear movement along a y-axis that is perpendicular to the x-axis and parallel to the first arm, and for rotational movement about a first rotational axis parallel to the x-axis; and an extending arm coupled to the second arm and parallel therewith, and configured for linear movement along a z-axis perpendicular to a plane defined by the x- and y-axes, and having a central shaft configured for rotational movement within the second arm about a second rotational axis parallel to the z-axis.

10. A positioning device according to claim 9, further comprising:
a first movement device associated with the base and configured to move the first arm along the x-axis;
a second movement device associated with the first arm and configured to move the second arm along the y-axis;
a third movement device associated with the second arm and configured to pivot the second arm about the first rotational axis;
a fourth movement device associated with the second arm and configured to move the extending arm along the z-axis; and
a fifth movement device associated with the extending arm and configured to rotate the central shaft of the extending arm about the second rotational axis.

11. A positioning device according to claim 10, wherein one or more of the movement device comprise handles associated therewith to implement the corresponding movement device.

12. A positioning device according to claim 9, further comprising:
a first measurement device associated with the base for determining the location of the first arm along the base;
a second measurement device associated with first arm for determining the location of the second arm along the first arm;
a third measurement device associated with the second arm for determining the pivot of the second arm about the first rotational axis with respect to the first arm;
a fourth measurement device associated with the second arm for determining the location of the extending arm along the second arm; and
a fifth measurement device associated with the extending arm for determining the rotation of the central shaft within the extending arm about the second rotational axis with respect to the second arm.

13. A positioning device according to claim 9, wherein the first and second arms are respectively coupled to the base and first arm using carriages.

14. A positioning device according to claim 9, further comprising one or more locking devices associated with each of the arms for locking the corresponding locations of each.

15. A positioning device according to claim 9, further comprising a tool holder coupled to an end of the extending arm and configured to hold a tool.

16. A positioning device according to claim 15, wherein the tool holder is configured to hold a nozzle of a waterjet cutting apparatus for directing a waterjet stream emerging from the nozzle.

17. A positioning device according to claim 16, wherein the arms and tool holder of the positioning device are adapted to orient the nozzle for directing the waterjet stream to cut an edge of a nonwoven material.

18. A method of positioning a tool, the method comprising:
moving a first arm across a base along a first horizontal axis
moving a second arm across the first arm along a second horizontal axis
extending an extending arm across the second arm along a vertical axis parallel to the second arm; and
pivoting the second arm with respect to the first arm about a first rotational axis parallel to the first horizontal axis;
rotating a central shaft within the extending arm about a second rotational axis parallel to the vertical axis.

19. A method according to claim 18, further comprising:
moving the first arm using a first movement device associated with the base;
moving the second arm using a second movement device associated with the first arm;
pivoting the second arm using a third movement device associated with the second arm;
extending the extending arm using a forth movement device associated with the second arm; and
rotating the central shaft within the extending arm using a fifth movement device associated with the extending arm.

20. A method according to claim 19, wherein one or more of the moving, extending, pivoting, and rotating comprises moving, extending, pivoting, and rotating with handles configured to implement the corresponding movement device.

21. A method according to claim 18, further comprising:
measuring a location of the first arm along the base;
measuring a location of the second arm along the first arm;
measuring the pivot of the second arm about the first rotational axis with respect to the first arm;
measuring a location of the extending arm along the second arm; and
measuring the rotation of the central shaft within the extending arm about the second rotational axis with respect to the second arm.

22. A method according to claim 18, further comprising locking the corresponding locations of each of the arms.

23. A method according to claim 18, further comprising moving the first and second arms by sliding corresponding carriages coupled thereto across the base and first arm, respectively.

24. A method according to claim 18, further comprising coupling a tool holder to an end of the extending arm, the tool holder configured to hold a tool.

25. A method according to claim 24, wherein coupling comprises coupling a tool holder configured to hold a nozzle of a waterjet cutting apparatus for directing a waterjet stream emerging from the nozzle.

26. A method according to claim 25, further comprising orienting the nozzle using one or more of the moving, extending, pivoting, and rotating to direct the waterjet stream to cut an edge of a nonwoven material.

* * * * *